July 23, 1963 J. E. HEIDER 3,098,593
PLASTIC BOTTLE FORMING METHOD AND APPARATUS
Filed May 8, 1961 3 Sheets-Sheet 2

INVENTOR.
JAMES E. HEIDER
BY
CHARLES S. LYNCH
& W. A. SCHAICH
ATTORNEYS

July 23, 1963

J. E. HEIDER 3,098,593

PLASTIC BOTTLE FORMING METHOD AND APPARATUS

Filed May 8, 1961

INVENTOR.
JAMES E. HEIDER
BY
CHARLES S. LYNCH
& W. A. SCHAICH
ATTORNEYS

United States Patent Office 3,098,593
Patented July 23, 1963

3,098,593
PLASTIC BOTTLE FORMING METHOD
AND APPARATUS
James E. Heider, Princeton, N.J., assignor to Owens-Illinois Glass Company, a corporation of Ohio
Filed May 8, 1961, Ser. No. 108,460
7 Claims. (Cl. 225—4)

My invention relates to a method and apparatus for use in the manufacture of bottles and the like containers from polyethylene or other elastomeric materials.

This invention constitutes an improvement of the "tail" removal aspects of mechanism disclosed in a copending application of Richard C. Allen and Leon E. Elphee, Serial No. 797,276, filed March 4, 1959, now Patent No. 3,008,192, and assigned to the assignee of the present invention.

As indicated in the Allen et al. application, it is conventional practice to fabricate blown plastic containers in such fashion that each includes a pendent "tail" portion which is gripped by a pair of jaws, such facilitating proper support or stabilization of the containers during their removal from a forming machine. These containers are of very light weight and often quite unstable, because of such lightness and a high center of gravity. Upon completion of the take-out phase, grippers, individual to the containers, firmly grasp the "tails" and pull them downwardly, thus tearing them from the containers.

Such procedure I consider not to be the most desirable and a purpose of my invention is to provide apparatus and a method which involves low initial cost and maintenance and one which is capable of effecting "tail" or flash removal even after cooling. My method and apparatus I believe to be a distinct advance in the art.

An important object of my invention is the provision of take-out and "tail" removal apparatus which insures both stability of the containers at all times and clean, rapid separation of the "tails" from the containers, even though there has been some appreciable time lapse between fabrication of the containers and initiation of the "tail" removal operation. Heretofore it has been necessary to effect such removal prior to any appreciable cooling and setting of the thermoplastic.

A further object of my invention is the provision of "tail" removing apparatus and method, the functioning of which involves advancing bottles in normal upright positions along a predetermined path and holding them against bodily rotation on their axes while a pair of chains operate to firmly grasp the "tails" and by a sort of modified shearing action pull and twist them laterally away from their otherwise normal path of travel with their respective containers.

Other objects will be in part apparent and in part pointed out hereinafter.

In the accompanying drawings forming a part of my application:

Figure 1:
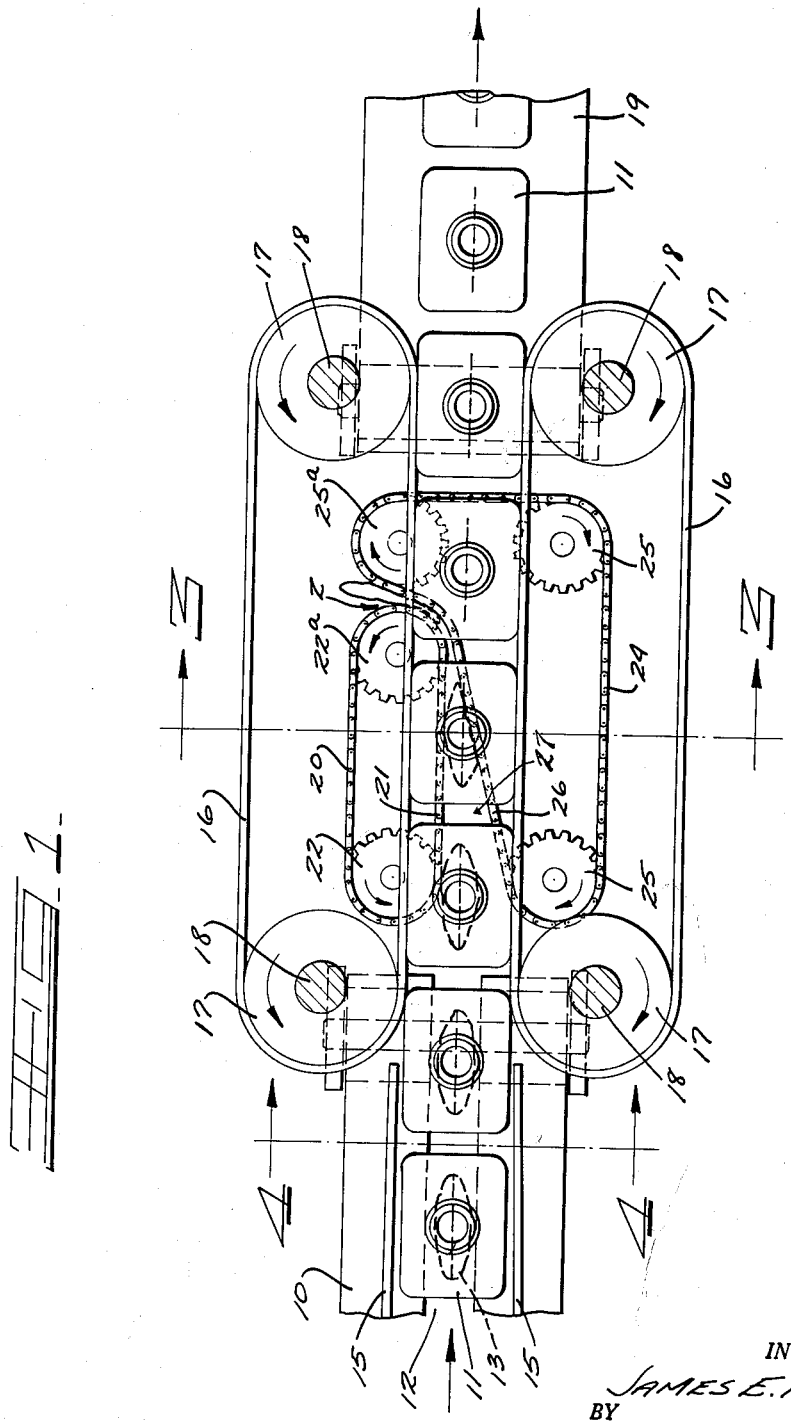
FIG. 1 is a top plan view of my invention.
Figure 2:
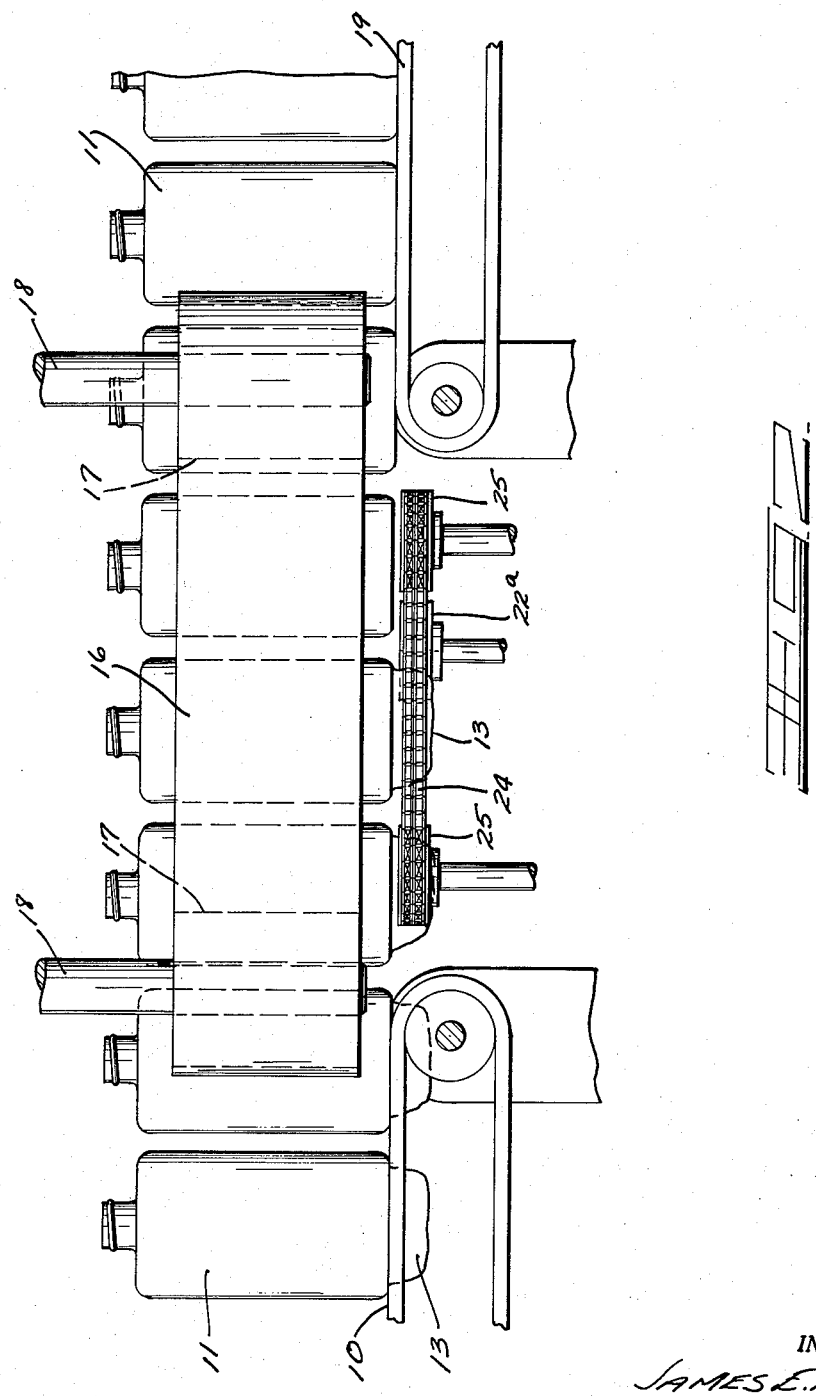
FIG. 2 is a side elevational view thereof, with the guide rails removed.
Figure 3:
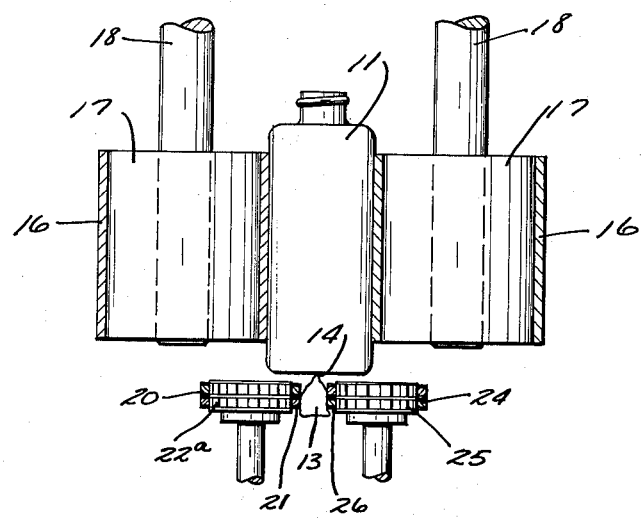
FIG. 3 is a sectional elevational view taken along the line 3—3 of FIG. 1.
Figure 4:
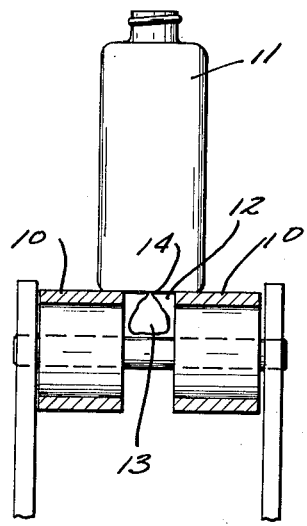
FIG. 4 is a sectional elevational view taken along the line 4—4 of FIG. 1 with the guide rails omitted.

In the illustrated embodiment of my invention it includes a "dropped" center conveyor belt 10 which comprises, essentially, a pair of side by side horizontal belts which support bottles 11 or the like containers in upright positions immediately upon their removal from a forming machine (not shown), such to occupy a position to the left side of FIGS. 1 and 2. These belts are driven either continuously, or intermittently, as operating conditions demand, by a motor (not shown). They are spaced apart horizontally merely to provide a space 12 which accommodates the pendent "tails" 13 which, at this stage, remain united to the bottles 11 by a relatively thin neck 14. Guide rails 15 (FIG. 1) aid in proper positioning the bottles upon the belts 10.

As the upright containers are discharged from the belts 10 they are immediately grasped between and supported in normal upright position by a pair of side gripper belts 16. These belts run in an on-edge position, each being trained over a pair of pulleys 17 or rolls which are mounted upon rotating vertical shafts 18. One of each pair of shafts 18, of course, is positively driven by any suitable means (not shown). The bottles, following removal of the "tails," come to rest, upright, upon a conveyor 19 which carries them to a packing table, or accumulator (not shown), where operators place them in cartons for shipment.

While the bottles are firmly grasped by the gripper belts 16 and effectively held against turning on their axes and dropping, and during their uninterrupted advance, the "tails" are cleanly and quickly torn away. According to my invention this "tail" removal is effected by a pair of cooperating endless chains (FIG. 1), one of these chains 20 having a bottle "tail" contacting reach 21 disposed parallel with and at one side of the center line of the path traveled by the bottles and being trained over a pair of longitudinally spaced apart sprockets 22 and 22ᵃ. These sprockets are mounted upon vertical shafts 23 and one sprocket 22ᵃ is driven by a motor (not shown), or the like power plant. The other chain 24 is trained over sprockets 25, one 25ᵃ of which may be driven either continuously, or intermittently, as desired. This second chain defines a generally right-angled triangular path, with the hypotenuse section 26 extending diagonally across the path of advance of the "tails." This section 26 and the reach 21 of the other chain 20 together provide a longitudinal space 27 which diminishes in transverse width forwardly. Moreover the path becomes progressively offset laterally relative to the line of "tail" travel and (FIG. 1) gradually assumes an arcuate form as the chains approach and enter the zone Z between the driven sprockets 22ᵃ and 25ᵃ. These two sprockets are arranged side by side and sufficiently close together that the two chains would normally physically contact one another at about the time they come into engagement with said sprockets.

Thus the "tails" are gradually grasped and likewise twisted about the axes of the bottles. As they approach the more or less lateral offset in the path near the two driven sprockets, the "tails" are very tightly gripped between the chains, twisted, as just stated, and torn from the bottles. The "tails" are then carried away by the chains and discharged to one side of said sprockets.

Modifications may be resorted to within the spirit and scope of the appended claims.

I claim:

1. The method of removing pendent tails from the bottom end of plastic containers consisting in advancing the containers continuously in normal upright position along a preselected path, gripping the tails and then pulling them laterally out of the path being traveled by and relative to the containers.

2. The method defined in claim 1 and during at least a part of the period of lateral movement of the tails, bodily twisting them about a constantly shifting vertical axis.

3. The method of removing flash from formed plastic articles which comprises moving the articles along a predetermined path, supporting the articles against lateral displacement relative to such path and grasping and laterally pulling the flash to separate same from the moving articles.

4. In apparatus for removing pendent tails from the bottom of plastic containers, means for engaging opposed sides of containers while in normal upright position and carrying them so positioned through a tail removal zone, and means beneath the container grasping means for gripping the tails and pulling them laterally of the path of advance of and relative to the containers.

5. Apparatus as defined in claim 4, the tail gripping means being a pair of cooperating chains one at each side of the path of normal travel of the tails, means for driving the chains each with one reach engageable with an adjacent side of a tail, and said chains having sections defining a generally lateral path along which they pull the tails bodily to separate them from the containers.

6. Apparatus as defined in claim 5, one chain having a reach extending alongside the normal line of travel of pendent tails and the other chain defining a generally right-angled defining path in top plan with that chain section defining the hypotenuse extending diagonally across said line of travel of the tails and on that side of said line on which the first chain is positioned, cooperating with the latter in gripping and separating the tails from the containers.

7. Apparatus as defined in claim 4, the tail gripping and removal means being a pair of driven sprocket chains having reaches defining a forwardly narrowing path generally in alignment with the line of travel of the tails with one chain at each side of the tails, said chains at the narrow end of said path being curved generally laterally whereby tails gripped between the chains and moved bodily laterally relative to the containers.

References Cited in the file of this patent
UNITED STATES PATENTS

| | | |
|---|---|---|
| 751,568 | Sielaff | Feb. 9, 1904 |
| 2,890,483 | Soubier | June 16, 1959 |
| 2,975,471 | Sherman | Mar. 21, 1961 |